United States Patent [19]
Bell et al.

[11] Patent Number: 5,727,205
[45] Date of Patent: Mar. 10, 1998

[54] FILE INSTALLATION SYSTEM FOR DISPLAYING BITMAPS DURING FILE INSTALLATION

[75] Inventors: David R. Bell, Rancho Santa Margarita; Thomas R. Ramsdell, Lomita, both of Calif.

[73] Assignee: Canon Information Systems, Inc., Irvine, Calif.

[21] Appl. No.: 496,157

[22] Filed: Jun. 28, 1995

[51] Int. Cl.⁶ .................................................. G06F 17/30
[52] U.S. Cl. ......................... 395/616; 395/618; 395/619
[58] Field of Search ................................ 395/616, 618, 395/275, 700, 712, 619; 334/118

[56] References Cited

U.S. PATENT DOCUMENTS

| | | | |
|---|---|---|---|
| 5,155,847 | 10/1992 | Kirouac et al. | 395/600 |
| 5,363,487 | 11/1994 | Willman et al. | 395/275 |
| 5,367,686 | 11/1994 | Fisher et al. | 395/700 |
| 5,421,009 | 5/1995 | Platt | 395/600 |
| 5,481,714 | 1/1996 | Pipkin et al. | 395/700 |
| 5,548,759 | 8/1996 | Lipe | 395/600 |
| 5,555,416 | 9/1996 | Owens et al. | 395/700 |
| 5,590,318 | 12/1996 | Zbikowski et al. | 395/618 |
| 5,597,307 | 1/1997 | Redford et al. | 434/118 |
| 5,604,906 | 2/1997 | Murphy et al. | 395/712 |

OTHER PUBLICATIONS

*Win 3.1 SDK: Setup Toolkit for Windows*, Microsoft Development Library, Microsoft Corporation, 1992–1995.
Shield Series, "Development Tools for Graphical Environments", *Developer's Guide and Reference Manual*, The Stirling Group®, date unknown.

*Primary Examiner*—Thomas G. Black
*Assistant Examiner*—Frantz Coby
*Attorney, Agent, or Firm*—Fitzpatrick, Cella, Harper & Scinto

[57] ABSTRACT

The present invention is a file installation system for sequentially displaying bitmap images on an end-user's system during file installation by sequentially retrieving computer files from a computer-usable medium and installing or displaying files stored on a distribution media disk to an end-user's system. The system includes an input for inputting an install command, a disk drive for retrieving a setup file from the distribution media disk in response to the input install command, a memory for storing the retrieved setup file, and a processor for retrieving the setup file from memory and executing the setup file. The processor, based on executed process steps in the setup file, performs the steps of 1) displaying at least one file installation option, 2) associating, in response to a selection of one of the at least one file installation options, a predefined destination code with the selected file installation option, 3) sequentially retrieving, in response to the selection of one of the at least one file installation options, computer files from the distribution media disk, said computer files each having a file destination code appended thereto, 4) determining, based on the appended destination code, whether the retrieved file should be installed on the end-user's system, displayed on the end-user's system, or not installed on the end-user's system, 5) installing, based on a determination result that the retrieved file is to be installed, the retrieved file on the end-user's system, and 6) displaying, based on a determination result that the retrieved file is to be displayed, the retrieved file on the end-user's system.

56 Claims, 11 Drawing Sheets

FILE INSTALLATION SYSTEM FOR DISPLAYING BITMAPS DURING FILE INSTALLATION

BACKGROUND OF THE INVENTION

1. Field of the Invention

The present invention relates to a file installation system which sequentially retrieves files from a distribution media, such as a floppy disk, and which determines for each file whether the file should be copied from the distribution media to an end-user's system or whether that file should be displayed to a user during the installation of files from the distribution media to the end-user's system and, more particularly, to a file installation system which sequentially displays bitmap images on an end-user's system during file installation in accordance with the retrieval of its corresponding bitmap file from the distribution media.

2. Description of the Related Art

Conventional setup configuration programs, such as InstallShield by the Stirling Group of Microsoft's Distribution Layout Utility, use a time-based or percentage-of-installation-based method of scheduling bitmap files to be displayed during the installation process. However, problems arise with the percentage-based method when an installation includes a large file which comprises a majority of the installation itself, thus leaving files that were supposed to be displayed in given intervals consumed by the installation of the large file, undisplayed to the user. Likewise, the time-based solution fails when an installation progresses faster than the total of time specified for all of the files to be displayed, thus leaving the files scheduled to be displayed later than the total installation time undisplayed or when a distribution media containing these files is originally designed to be installed by a system which has the same device speeds and characteristics as the distribution system. For example, if during the original design for distributing a software product, requirements for installing the software product was designed for a quad-speed CD-ROM drive and the end-user's system includes either a dual speed or a 6×speed, the timing of bitmaps would be skewed relative to the speed of the end-user's system. Additionally, these programs require the person configuring the setup program (hereinafter referred to as "the programmer") to type in a command in a script to display the file to be displayed.

Accordingly, there exists a need to give the programmer a fine degree of control as to scheduling when bitmap images are displayed to the end-user during the installation process that will guarantee the bitmap images are displayed to the end-user. Additionally, there is a need to give the programmer a means to easily specify that a file is indeed to be displayed rather than installed without having to type in commands in a script.

SUMMARY OF THE INVENTION

These needs are addressed by the present invention by providing a file installation system which sequentially retrieves files from a distribution media and if the file is a bitmap file, the file is displayed in the sequence in which it is retrieved from the distribution media. In this manner, the setup program which performs the installation process can be controlled to schedule display of bitmap images to the end-user during installation based on the sequential order of bitmap files stored on a distribution media.

According to one aspect of the present invention, a file installation method sequentially displays bitmap images on an end-user's system during file installation by sequentially retrieving computer files from a computer-usable medium and performs the tasks of either installing or displaying a computer file stored on the computer-usable medium onto an end-user's system. The method includes the steps of sequentially retrieving computer files from the computer-usable medium, the retrieved computer files each having a file destination code appended thereto, determining, based on the appended file destination code, whether a retrieved file should be installed to the end-user's system, displayed on the end-user's system, or not installed on the end-user's system, installing, based on a determination result that the file is to be installed, the retrieved file on the end-user's system, and displaying, based on a determination result that the retrieved file is to be displayed, the retrieved file on the end-user's system.

According to another aspect of the invention, a file installation system sequentially displays bitmap images on an end-user's system during file installation by sequentially retrieving computer files from a computer-usable medium and installs or displays files stored on a distribution media disk to an end-user's system. The file installation system includes an input means for inputting an install command, a disk drive for retrieving a setup file from the distribution media disk in response to the install command input by the input means, memory means for storing the retrieved setup file, and process means for retrieving the setup file from memory and executing the setup file. The process means, based on the executed process steps in the setup file, performs the steps of 1) displaying at least one file installation option, 2) associating, in response to a selection of at least one of the at least one file installation options, a predefined destination code with the selected file installation option, 3) sequentially retrieving, in response to the selection of one of the at least one file installation options, computer files from the distribution media disk, said computer files each having a file destination code appended thereto, 4) determining, based on the appended destination code, whether a retrieved file should be installed on the end-user's system, displayed on the end-user's system, or not installed on the end-user's system, 5) installing, based on a determination result that the retrieved file is to be installed, the retrieved file on the end-user's system, and 6) displaying, based on a determination result that the retrieved file is to be displayed, the retrieved file on the end-user's system.

DETAILED DESCRIPTION OF THE PREFERRED EMBODIMENT

Figure 1:
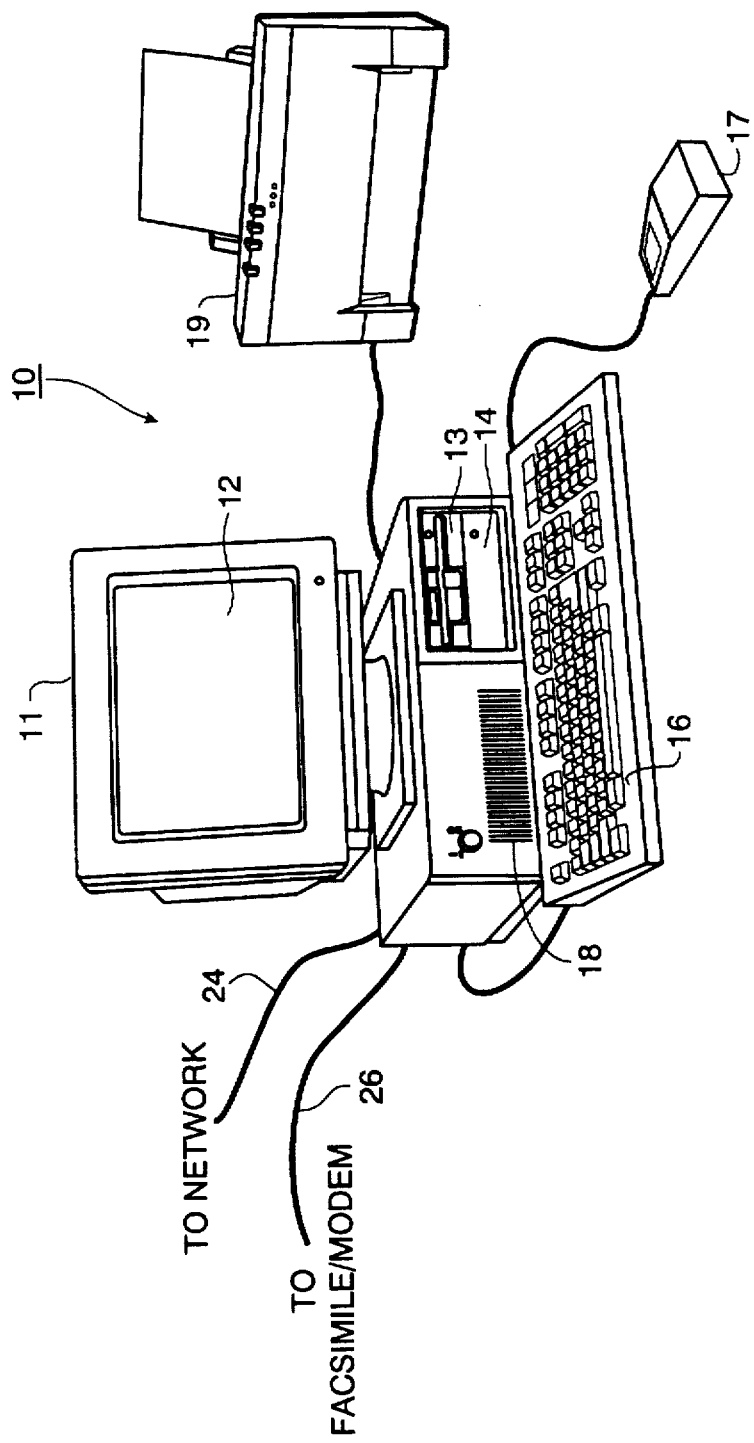
FIG. 1 is a view showing the outward appearance of representative computing equipment which incorporates a file installation system for displaying bitmaps during file installation according to the present invention.

FIG. 1 is a view showing the outward appearance of representative computing equipment which incorporates an installation program for displaying bitmaps during file installation according to the present invention.

Shown in FIG. 1 is computing equipment 10 such as an IBM PC or PC compatible computer having a windowing operation system such as Microsoft Windows Operating System. Computing equipment 10 is provided with monochromatic or color display monitor 11 having display screen 12, on which computing equipment 10 displays images to the user. Computing equipment 10 is further provided with floppy disk drive 13 with which removable floppy disk media may be read or written. Alternatively, a CD/ROM driver could be used in place of floppy disk drive 13.

Computing equipment 10 is also equipped with fixed disk drive 14 for storing data files and application program files, keyboard 16 for permitting input of text data and manipulation of objects displayed on display screen 22, pointing device 17, such as a mouse, which is provided for pointing and for manipulating objects displayed on display screen 12 as well, and a combined speaker/microphone 18.

A conventional color printer 19, such as a color bubble jet printer, is also provided for outputting documents processed by computing equipment 10.

Also provided are connections to network 24 or to facsimile/modem 26 for sending and receiving facsimile messages and other data files.

In accordance with operator instructions, and under control of the windowing operating system, stored application programs such as desktop publishing programs, drawing application programs, and the like, are selectively activated to process and to manipulate data. Also in accordance with operator instructions, and based on those stored application programs, commands are issued to copy files from floppy disk 44 via floppy disk driver 13 or to display images on monitor 11 and to print images appearing on monitor 11 by printer 19.

Figure 2:
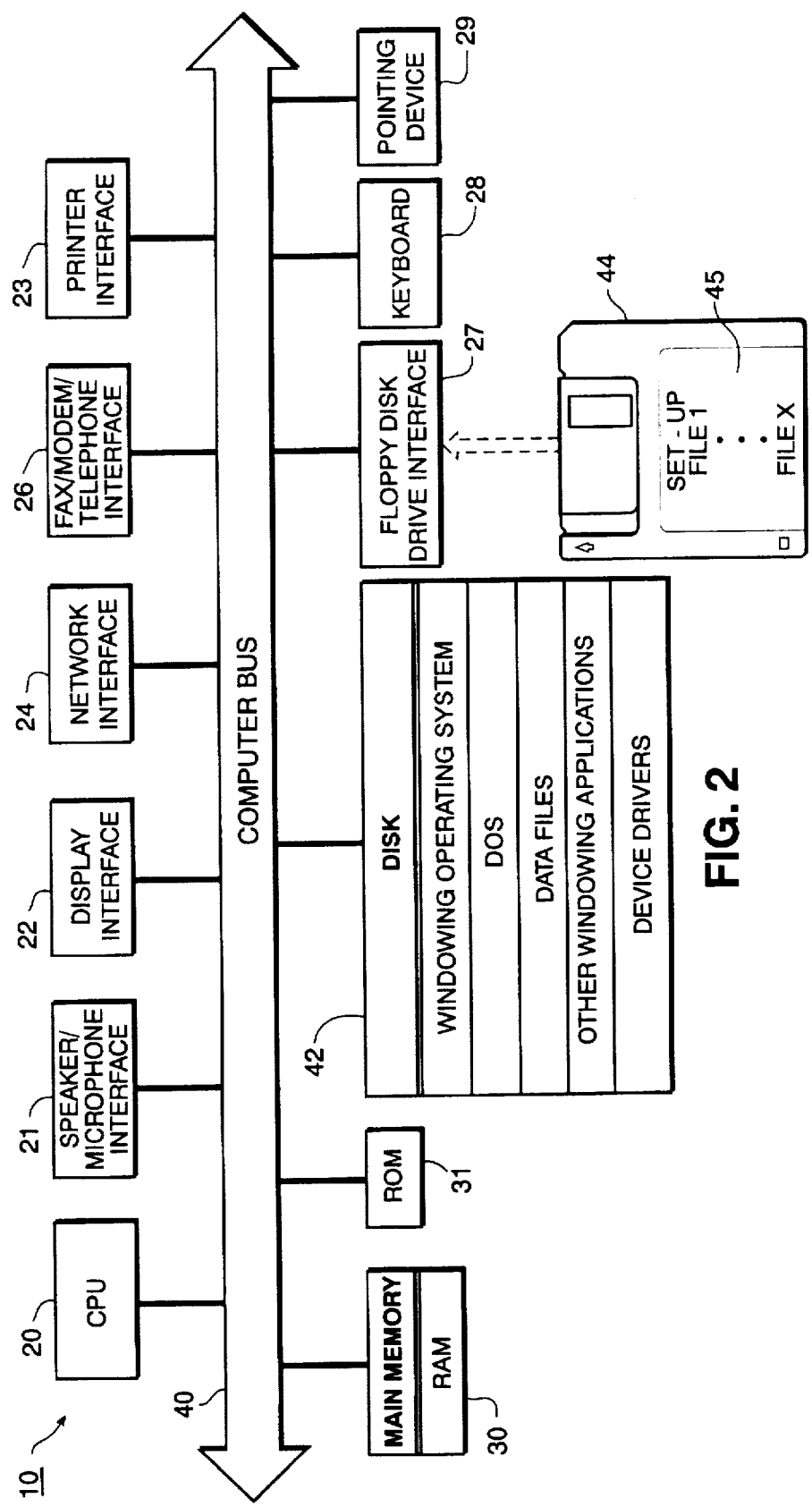
FIG. 2 is a detailed block diagram showing the internal construction of computing equipment shown in FIG. 1.

FIG. 2 is a detailed block diagram showing the internal construction of computing equipment 10. As shown in FIG. 2, computing equipment 10 includes a central processing unit (CPU) 20 such as a programmable microprocessor interfaced to computer bus 40. Also interfaced to computer bus 40 is speaker/microphone interface 21, display interface 22, network interface 24 for interfacing with a local area network, fax/modem/telephone interface 26 for interfacing to a telephone line, printer interface 23, and floppy disk drive interface 27.

Main memory 30, such as random access memory (RAM) interfaces to computer bus 40 so as to provide CPU 20 with access to memory storage. In particular, when executing stored application program instruction sequences such as those associated with application programs stored on disk 42. CPU 20 loads those instruction sequences from disk 42 (or other storage media such as media accessed via network interface 24 or floppy disk 44) into main memory 30 and executes those stored program instruction sequences out of main memory 30.

ROM (read-only memory) 31 is provided for storing invariant instruction sequences such as start-up instruction sequences of basic input/output operating system (BIOS) sequences for operation of keyboard 28.

As shown in FIG. 2, and as previously mentioned, fixed disk 42 stores program instruction sequences for Windows operating system and for various application programs such as graphic application programs, drawing application programs, desktop application programs, device drivers such as a printer driver, and the like.

Setup

In general, Setup 45 consists of one or more files which are contained on a distribution media such as a computer-usable medium, i.e., a floppy disk, CD-ROM, a computer bulletin board, or a network file server. In the present example, Setup 45, executable files, and non-executable data files are stored on floppy disk 44.

Upon being launched, Setup 45 is executed from floppy disk 44, without being installed, by the end user's system, and when executed, Setup 45 displays a start-up screen and title (FIG. 10) of an application or installable group of files (hereinafter "component") to be installed. For example, if Setup 45 is being provided with installable files for Visual Guide™, a product produced by Canon Information Systems for providing an on-line user's manual for a specific Canon product, it would display a start-up screen having a displayed title "Visual Guide".

Figure 10:
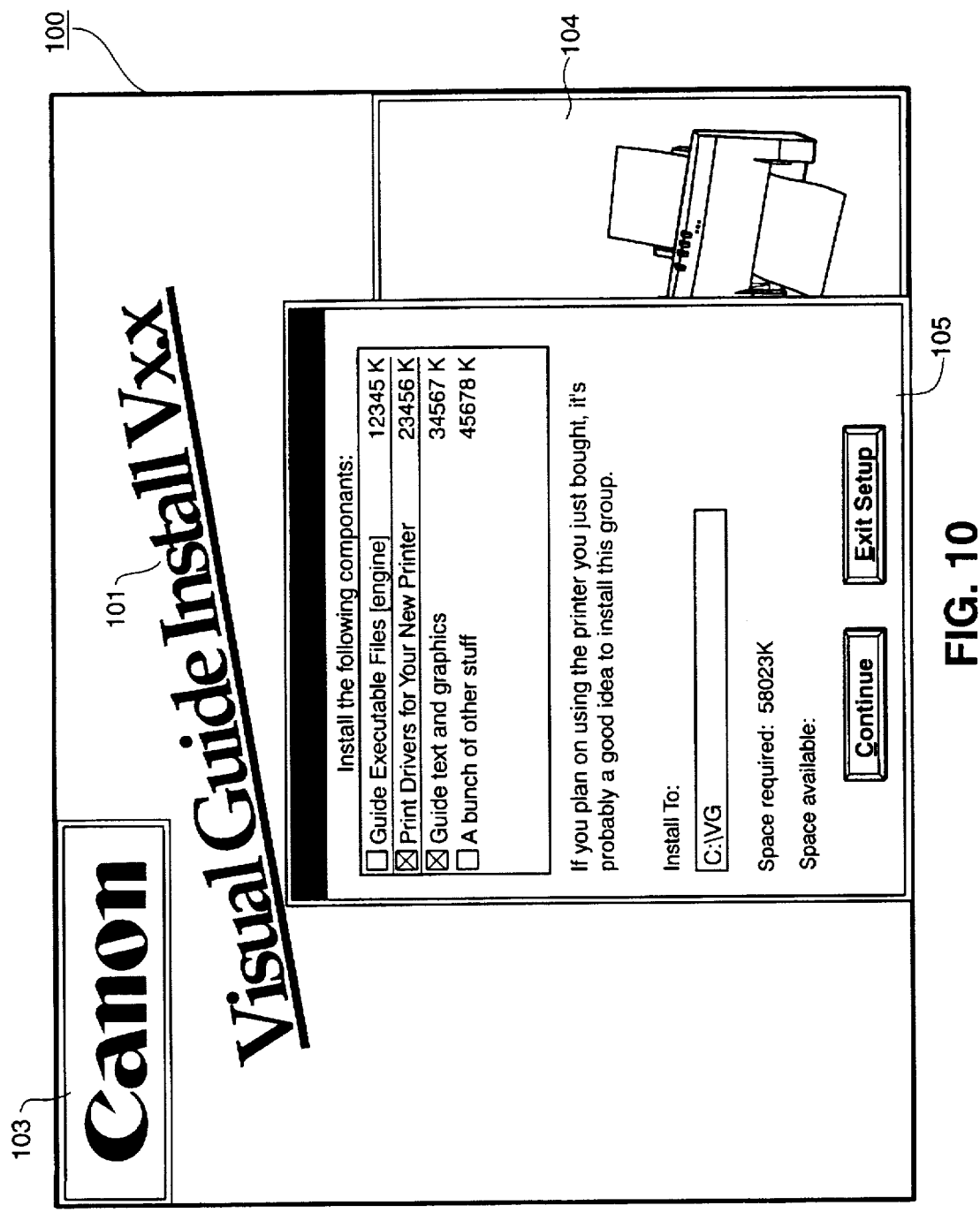
FIG. 10 is a representational view of an install start-up screen of the present invention.

Upon displaying the start-up screen and title, Setup 45 retrieves, if appropriate, at least one bitmap file from the distribution media which is to be displayed in a specific area of display screen 12. Bitmap files could be advertisements, or images of the product to be downloaded. Depending on display area destination codes, Setup 45 displays the bitmap images within the startup window (FIG. 10). After displaying the bitmap images, Setup 45 displays an installation dialog box with user-selectable options (FIG. 10).

Depending on an end-user's file installation option selection, various files from the distribution media are sequentially retrieved based on the file's stored sequential order by Setup 45. Upon retrieving a file in the selected component or application, Setup 45 determines whether that file is to be copied to the end user's system. If Setup 45 determines that the file is not to be copied to the end user's system, Setup 45 further determines if the file belongs to a current component or application. If it does not, the file will not be copied.

On the other hand, if the file does belong to the selected component or application and the file is a bitmap file, Setup 45 displays the bitmap image in the specified display area of display screen 12. In this regard, since files are retrieved from the distribution media in stored sequential order, bitmap images will be sequentially displayed to the end-user based on the order of which its corresponding bitmap file was loaded and then retrieved from the distribution media. As a result, in the case that a bitmap image is to be displayed in an area currently occupied by another bitmap image, Setup 45 closes down the other bitmap image and displays the subsequently retrieved bitmap image in its location.

Setup 45 then proceeds to the next file if there are any other files remaining on the computer-usable medium. On the other hand, if there are no files remaining, Setup 45 closes all bitmap images, any remaining dialog boxes and the start-up screen before terminating its process.

If a file is to be copied to the end user's system. Setup 45 determines if the file already exists on the end user's system. If no copy of the file exists on the end user's system, the file is automatically installed. On the other hand, if a copy does exist. Setup 45 compares the version date stamp of the file on the end user's system to the file to be installed. If the file to be installed has a version date which is later than the version date on the end user's system, then it will be installed. Otherwise, the file is not copied. Upon completing these steps, Setup 45 determines if there are more files to be installed. If no further files are to be installed, Setup 45 closes the bitmap images, any remaining dialog boxes, and the start-up screen and terminates processing.

Defining Destination Codes

Prior to describing the present invention in greater detail, a brief description will be provided as to how the files on the distribution media are designated as files to be installed or to be displayed. In this regard. Setup 45 of the present application processes files which have been stored onto computer-usable medium by Distribution Diskette Utility described in co-pending U.S. patent application Ser. No. 08/496,099, filed on Jun. 28, 1995, now allowed, to David Bell, et al. and assigned to Canon Information Systems, Inc.

In brief, the Distribution Diskette Utility program permits a software programmer to selectively distribute software files onto a computer-usable medium such as floppy diskettes, CD/ROM, etc., place files onto distribution media in such a way that the minimum number of media items are used, specify the order that the files are to be installed onto the distribution media, and specify whether the file is to be installed to an end user's system or to be displayed on the end-user's system.

A short description will be provided below in order to facilitate an understanding of how Setup 45 sequentially retrieves files from the distribution media, determines which files to install or to display and either installs or displays the retrieved file based on its sequential order or the distribution media. Distribution Diskette Utility application by Canon Information Systems, Inc. permits a software programmer to designate which files are to be stored on a distribution media and which files from the distribution media are to be installed and which are to be displayed by Setup 45. A more detailed description of the Distribution Diskette Utility is provided in co-pending U.S. patent application Ser. No. 08/496,099.

Figure 3:
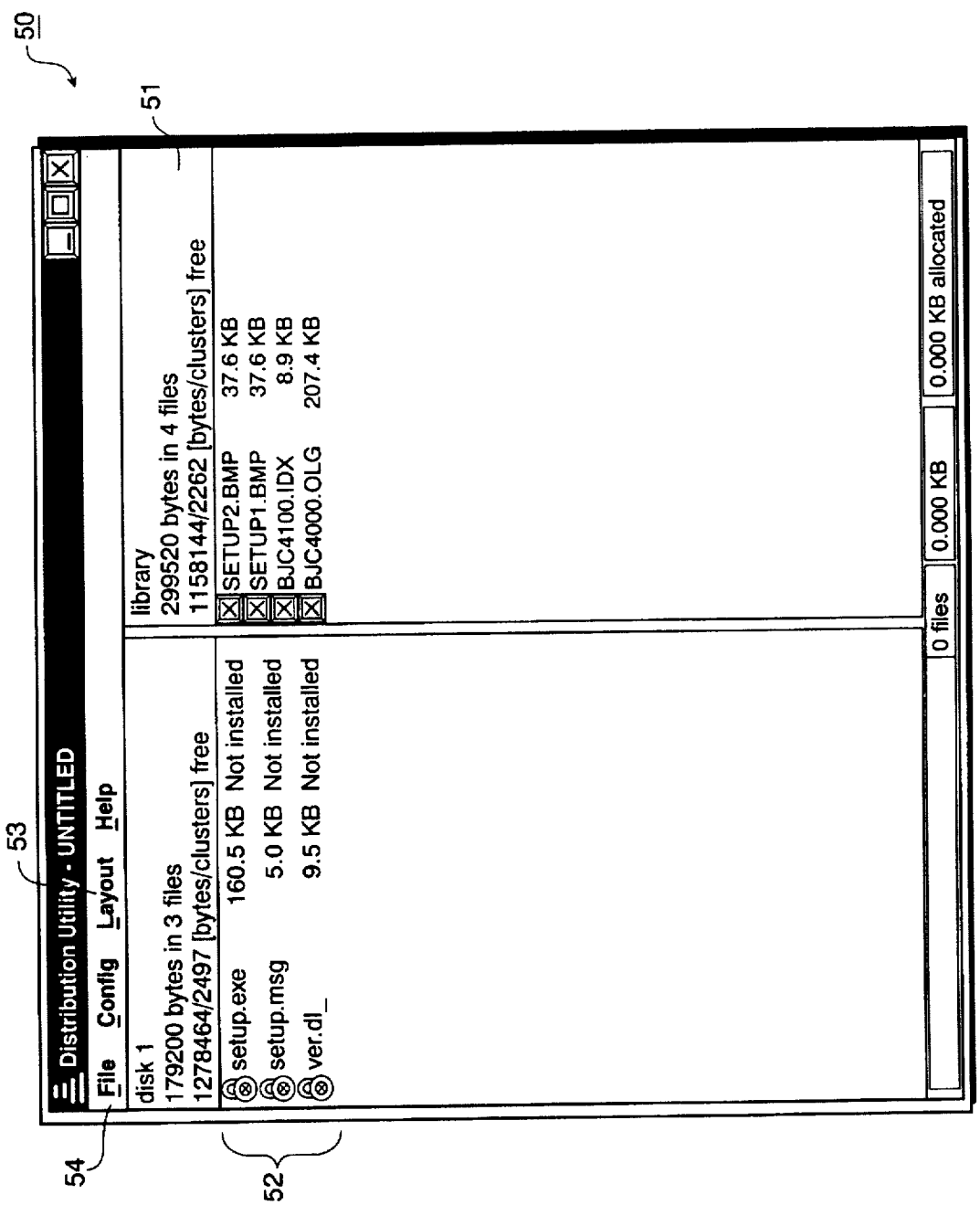
FIG. 3 is a representational view of a distribution utility window of a Distribution Diskette Utility program produced by Canon Information Systems, Inc. for use by a software programmer to assign files to a particular distribution media.

Referring to FIG. 3, upon being executed, the Distribution Diskette Utility displays distribution-utility window 50 to the programmer. In distribution-utility window 50, there is displayed a library 51 which contains software files from which the programmer can build a component or application by variously selecting files from library 51. Also shown in distribution-utility window 50 are three setup files 52 which are automatically placed onto a first distribution media, for example, disk 1 shown in FIG. 3. The setup files are automatically locked onto the first distribution media by the Distribution Diskette Utility.

Utilizing the distribution program, the programmer can designate various files from library 51 which are to be stored onto the distribution media, beginning with a storage area entitled disk 1. Upon selecting a file, the programmer must set a file's attributes in order to assign that file into a storage area. For example, the programmer must define where the file is to be installed or where it is to be displayed, which application or component the file belongs to (a file can belong to more than one, i.e., if a distribution media contains two or more applications or components, a single file may belong to all applications or components) and whether to compress or to lock the file onto a specific storage area, i.e., disk 1. It is these attributes that Setup 45 examines when determining where the file is to be installed or whether it is to be displayed.

Figure 4A:
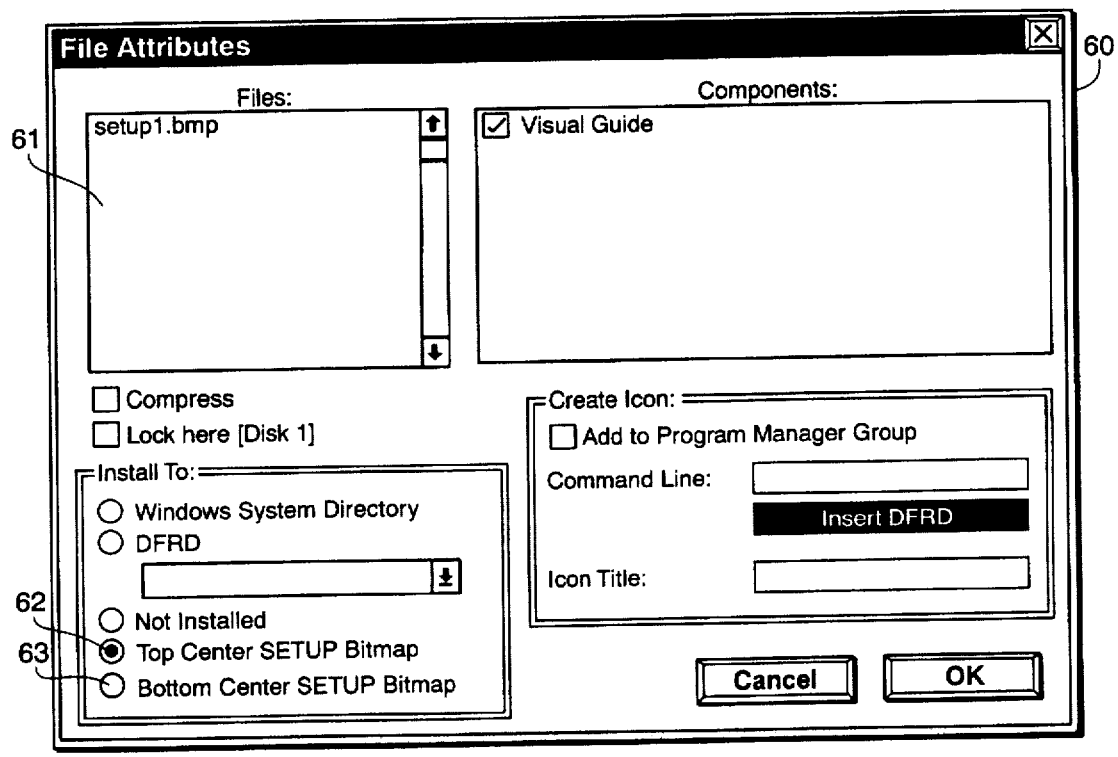
FIGS. 4A and 4B are representational views of a file attribute window of the Distribution Diskette Utility program which shows two bitmap files designated as files to be displayed on the end-user's system.

To set a file's attributes, the programmer first selects a file from library 51, such as SETUP1.BMP. Next, the programmer selects "Layout" 53 from menu bar 54 which provides the user with various selections, one of which is a "file-attributes" selection. Upon clicking on the file-attribute selection, "file-attributes" window 60 is displayed to the user as shown in FIG. 4A. For example, as shown in file-attributes window 60, SETUP1.BMP, the selected file, is displayed in "files" field 61. Also displayed in file-attributes window 60 is a variety of file destination options. For example, the programmer can select where to install a file based on a number of selections which include: Windows System Directory, Data File Root Directory (DFRD), Not Installed, Top Center Setup Bitmap, and Bottom Center Setup Bitmap. It is to be understood that the specific area for a bitmap image to be displayed is not limited to the above-mentioned selections, but can be any specified area of the display screen by modifying the options.

Figure 4B:
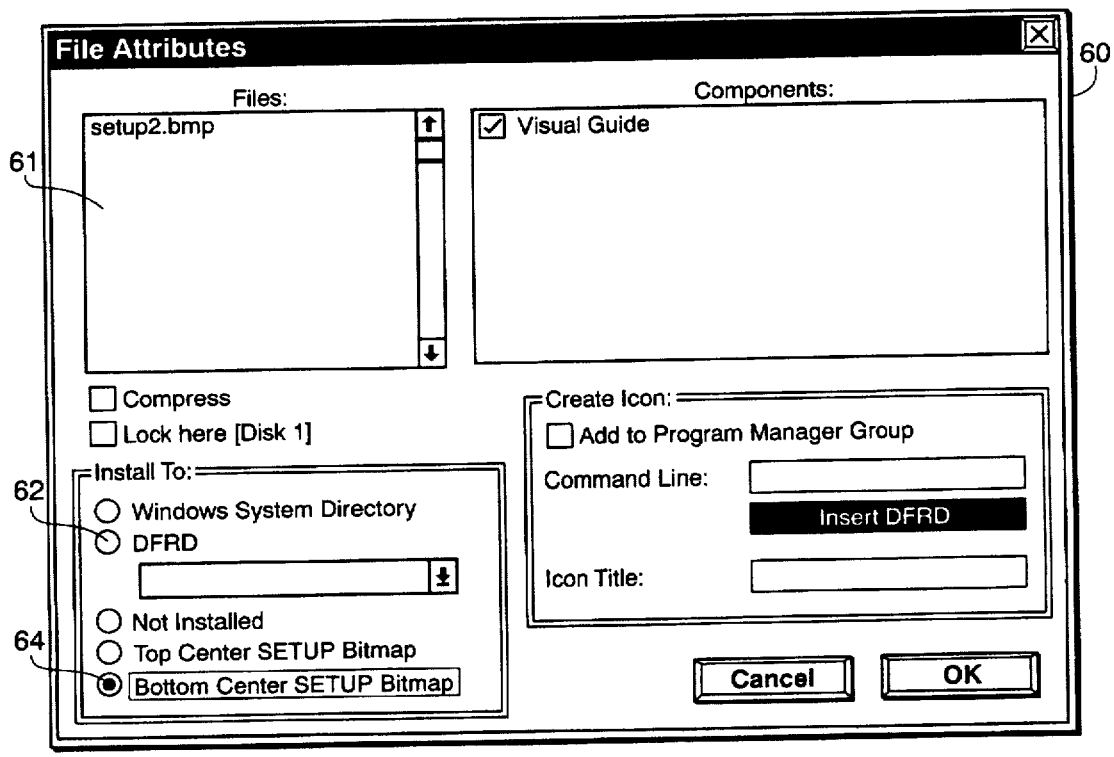

In the present example shown in FIG. 4A, SETUP1.BMP is designated as "top center" setup bitmap by clicking on radio button 62 in dialog box 63. Similarly, as shown in FIG. 4B, SETUP2.BMP has been selected from library 51 and is displayed in files field 61 in file-attributes window 60. However, SETUP2.BMP is designated as a "bottom center" setup bitmap as indicated by radio button 64 in dialog box 62.

Once the attributes of SETUP1.BMP and SETUP2.BMP have been designated, the programmer closes file-attributes window 60 and returns to distribution-utility window 50. At this point, the programmer can "drag and drop" these files into the area defined as disk 1 shown in FIG. 5.

Figure 5:
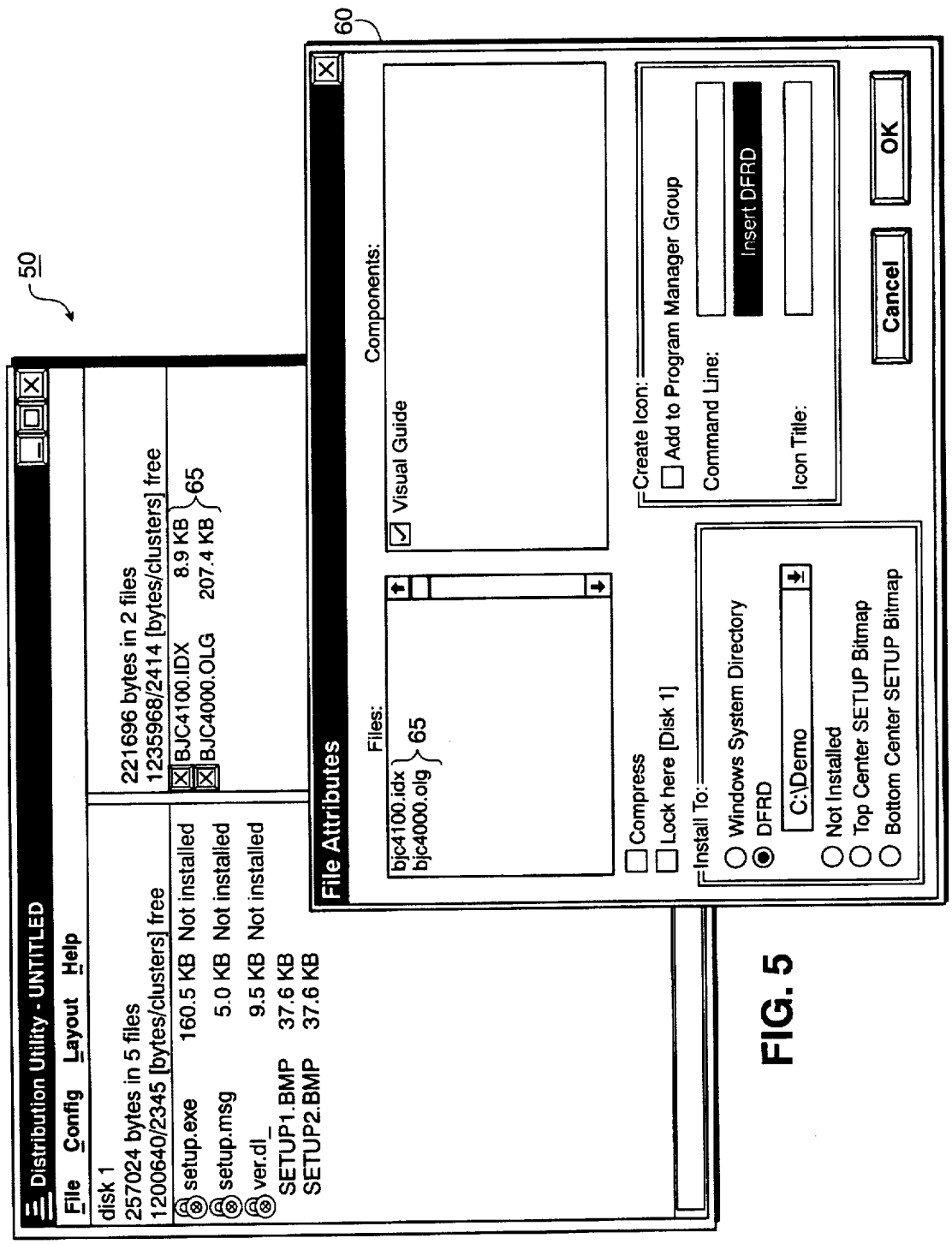
FIG. 5 shows both a representational view of a file attribute window of the Distribution Diskette Utility program which shows two files designated as files to be installed on the end-user's system, and an updated representational view of the distribution utility window showing the files from FIGS. 4A and 4B stored on distribution media, disk 1.

In a similar fashion, the programmer selects the two data files 65 (BJC4100.IDX and BJC4000.OLG), remaining in distribution-utility window 50 in FIG. 5. Using the file-attributes window 60, both data files 65 are designated as files to be installed on the DFRD which has been defined as "c:/Demo" on the end-user's system. Once the attributes of data files 65 have been set, the programmer returns to distribution-utility window 50, at which point the programmer "drags and drops" data files 65 into the area defined as disk 1.

Figure 6:
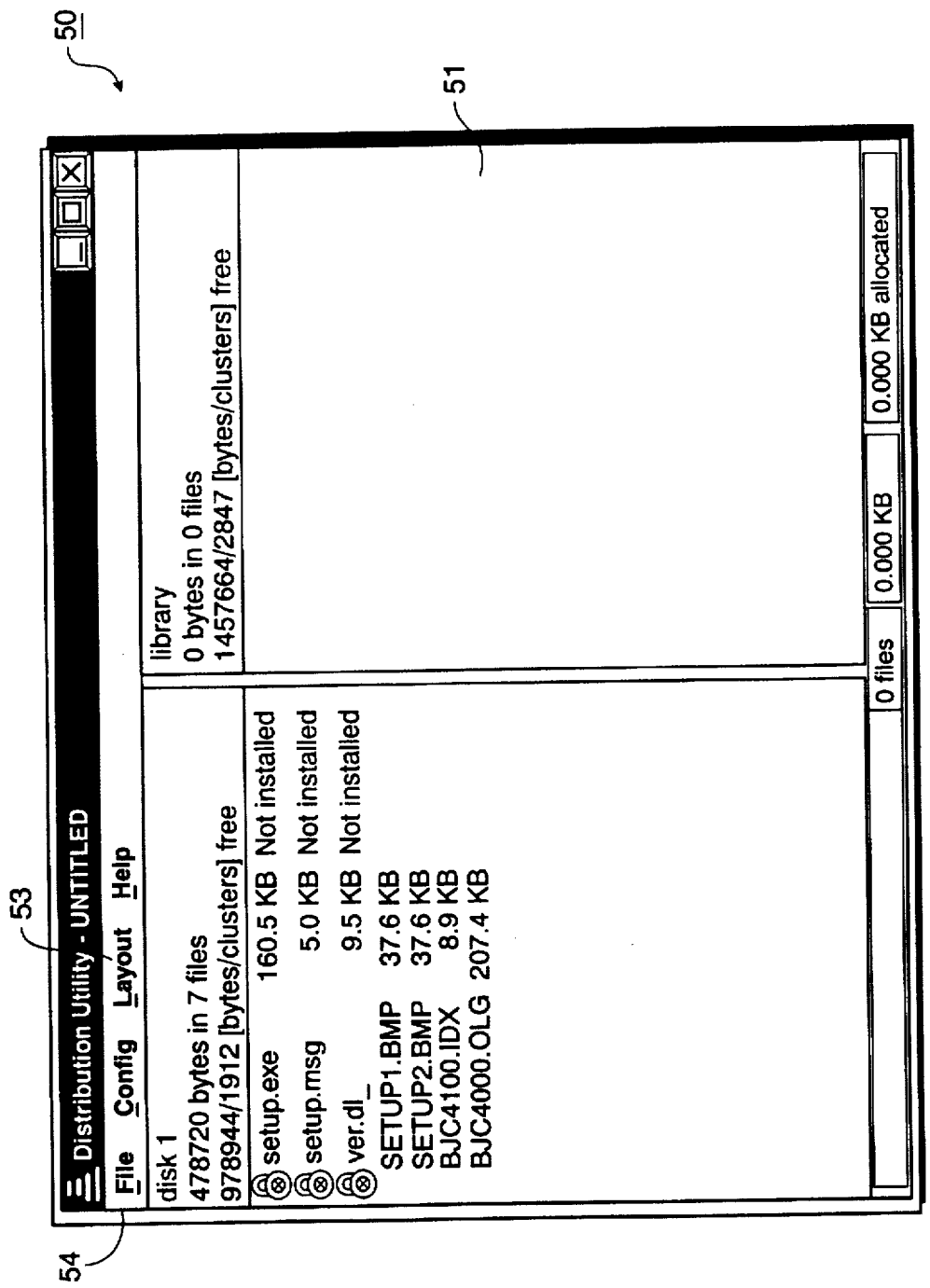
FIG. 6 is an updated representational view of the distribution window of the Distribution Diskette Utility program which shows all files assigned to distribution media, disk 1.

The resulting distribution and order of files to be stored onto disk 1 of a computer-usable media is shown in FIG. 6. In this regard, while not shown, each file includes a file destination code line which is appended to each file based on the assigned attributes by the Distribution Diskette Utility program. For example. SETUP1.BMP is assigned a destination code which reads: "SETUP1.BMP, tcbitmap" indicating that the file is to be displayed in the top center of the screen and data files 65 are assigned destination codes which read: "BJC4100.IDX, c:/Demo" and "BJC4000.OLG, c:/Demo", which indicates that these files are to be installed on the end-user's "c" drive.

Once each of the files have been assigned a destination command, and the programmer is satisfied with the manner in which each of the files have been distributed to the various distribution media such as floppy disk 44, the files are downloaded by Distribution Diskette Utility application to the various distribution media.

As mentioned previously, Setup 45 is installed automatically onto the first distribution media or disk 1. In this manner, the end-user simply inserts the first disk and types in "setup" at the end-user's system in order to begin installation of an application or a component stored on the distribution media.

Because Setup 45 is designed to retrieve files from the distribution media based on the file's sequential ordering on the distribution media, the programmer can schedule the display of bitmaps to an end-user during installation based on the programmer's file distribution, as discussed above. That is, since the programmer is aware during the authoring of a component or application that Setup 45 will retrieve and install or display a file based on its stored sequence, a schedule of bitmap display can be defined by the programmer by, for example, interleaving bitmap files between installable files. Thus, as shown in FIG. 6, Setup 45 would retrieve, in order, SETUP1.BMP, SETUP2.BMP, BJC4100.IDX and BJC4000.OLG.

Figure 11:
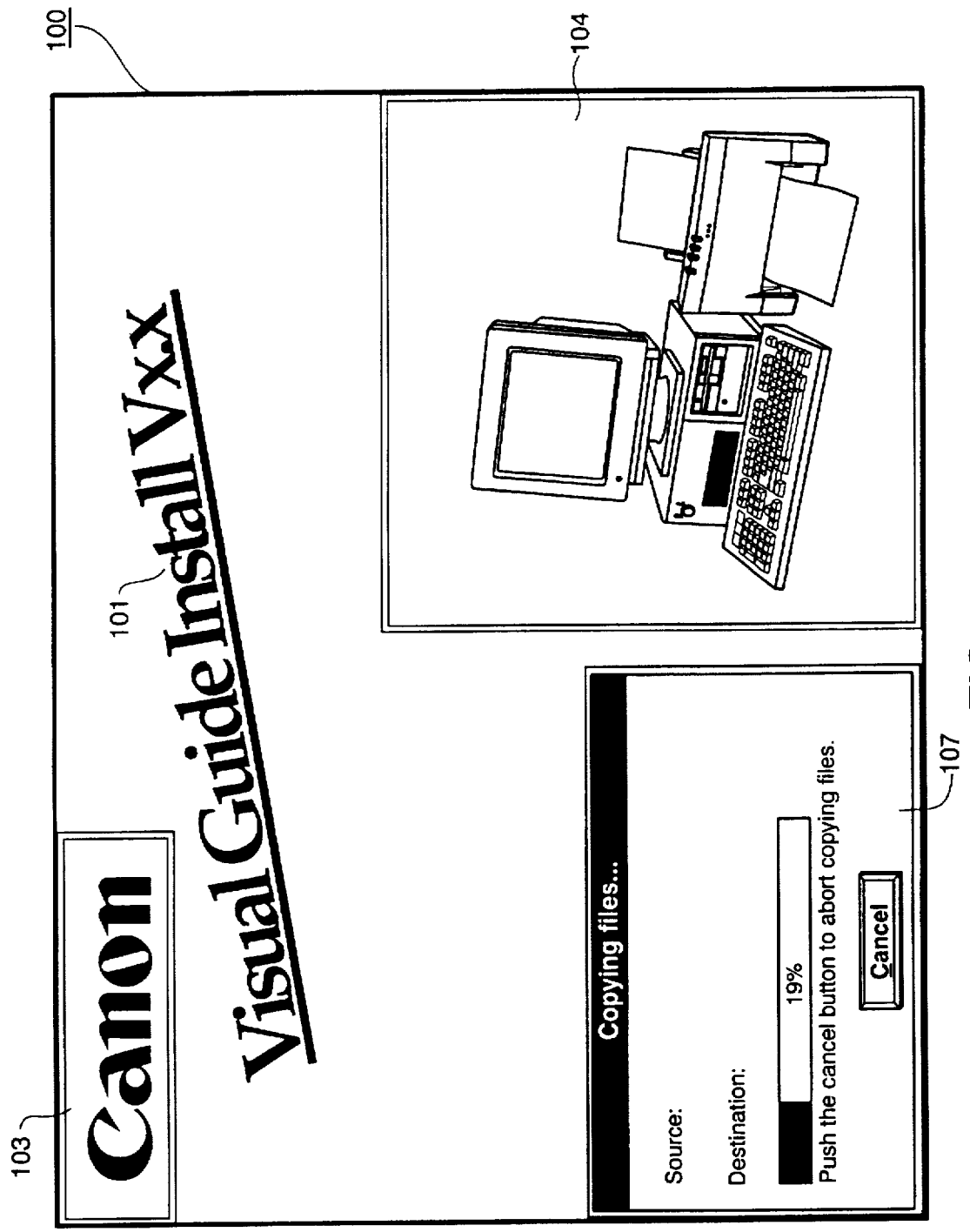
FIG. 11 is a representational view of the install start-up screen showing the installation progress of a file.

A more detailed description of the functionality and operation of the present invention will be described hereinbelow with respect to the flow diagrams illustrated in FIGS. 7, 8 and 9, and with respect to FIGS. 10 and 11.

Figure 7:
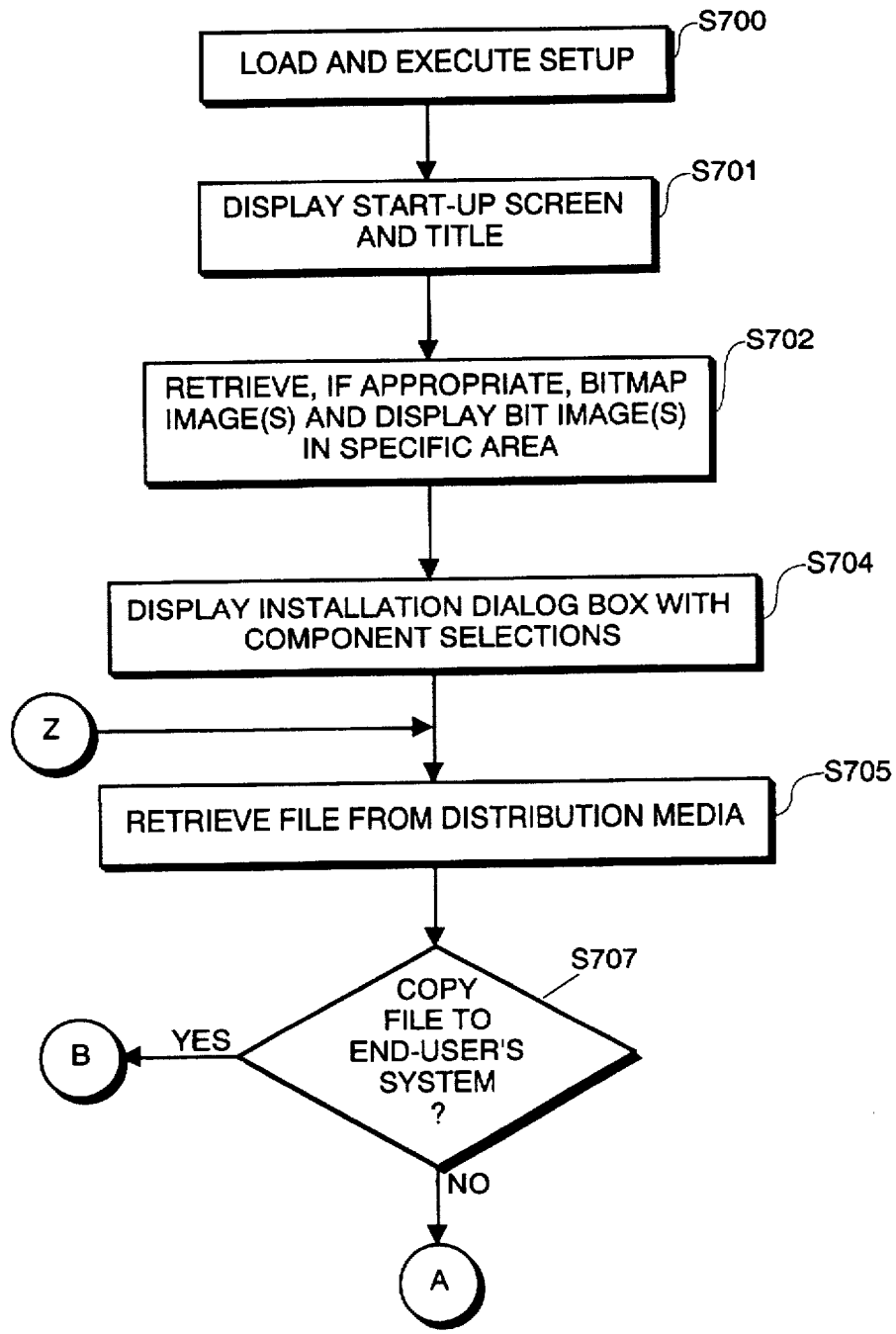
FIGS. 7–9 are flow diagrams describing how the setup program of the present invention determines whether to install or to display files stored on the distribution media onto an end-user's system.
Figure 8:
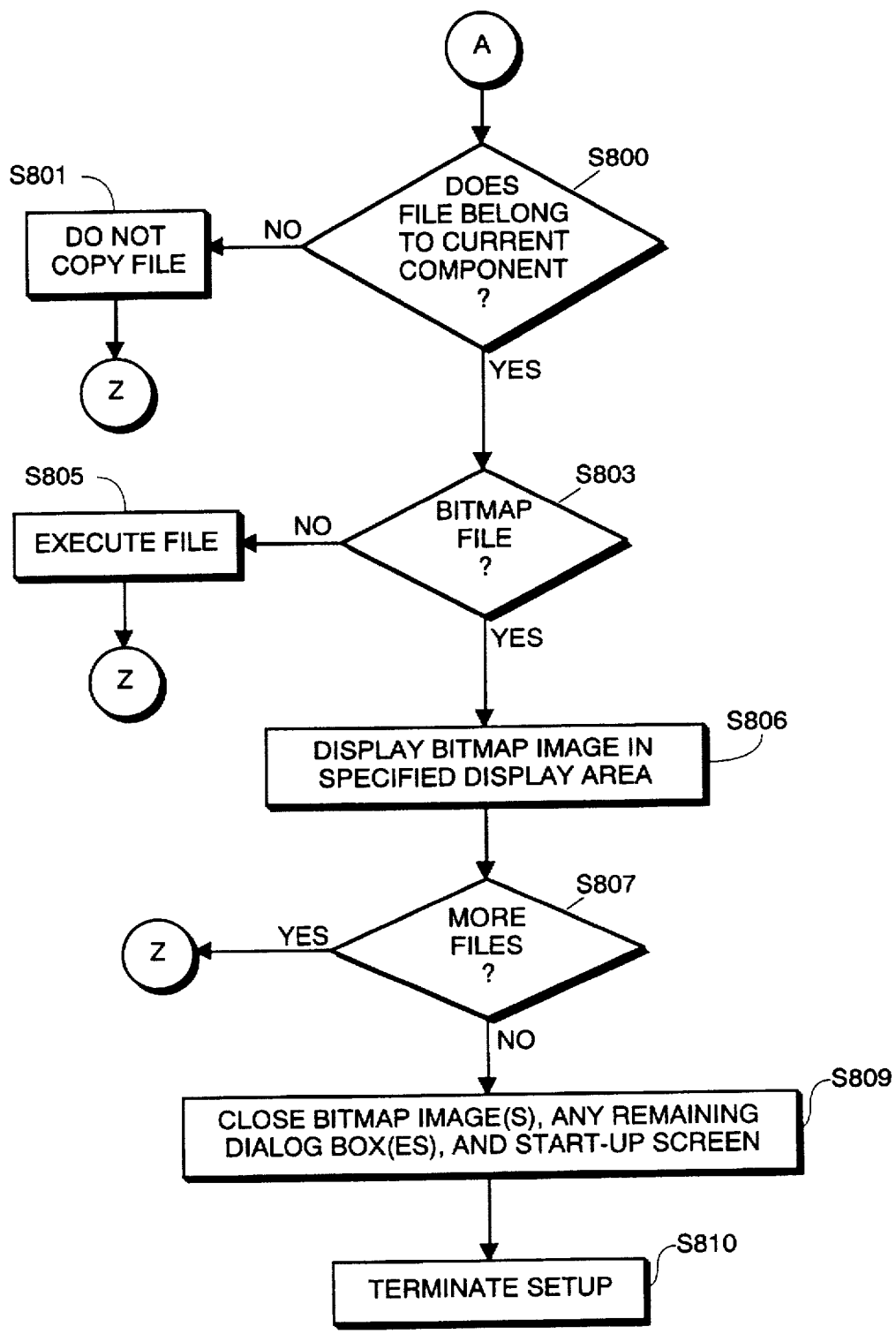
Figure 9:
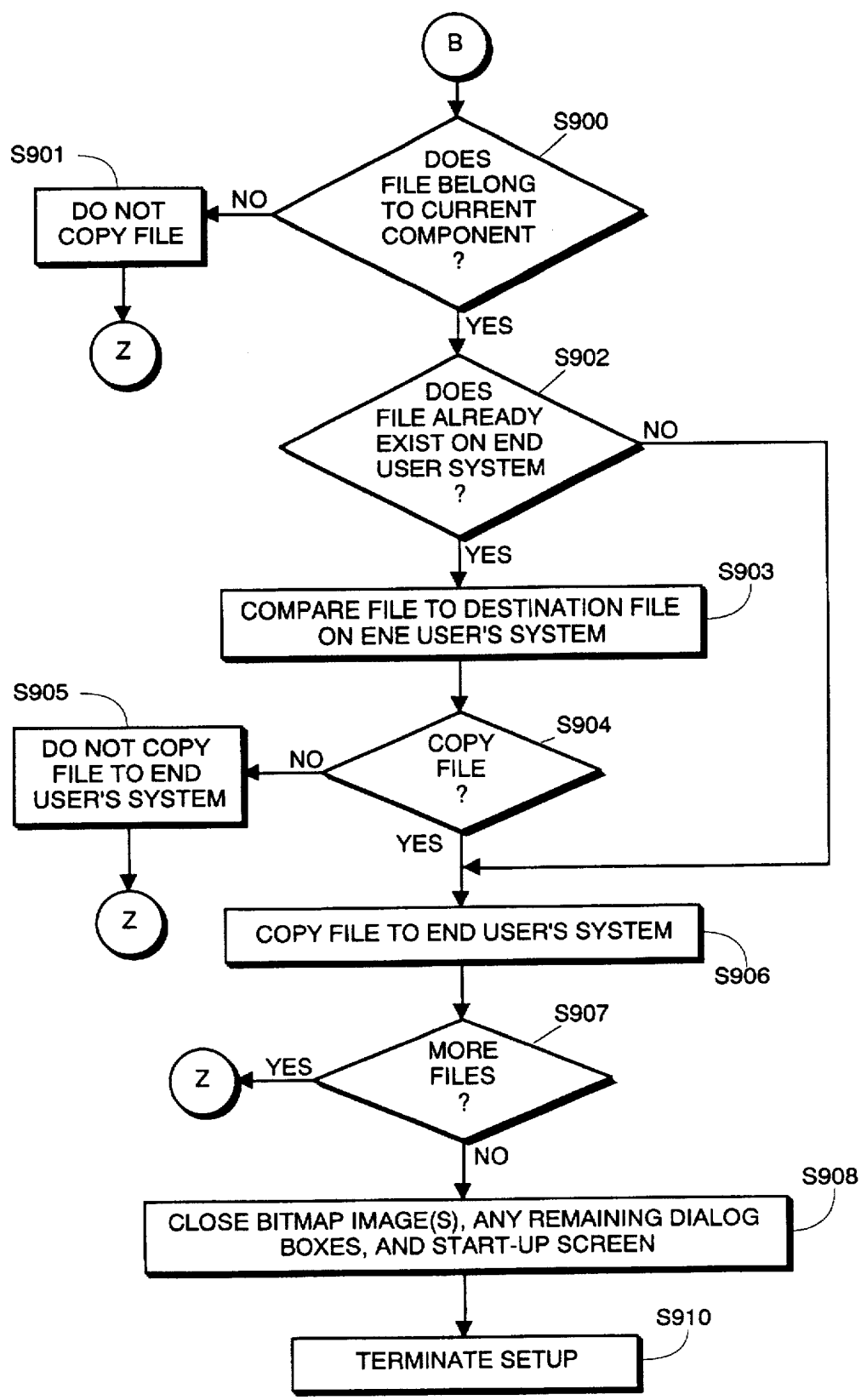

FIGS. 7–9 illustrate the method by which Setup 45 sequentially retrieves files from the distribution media and either installs or displays a file. To accomplish this task, Setup 45 1) determines whether a file contained on a distribution media should be copied to an end-user's system, 2) if it is not to be copied, whether the file belongs to a current component or current application being installed, 3) whether the file is a bitmap file which is to be displayed in a specified display area on display screen 12, and 4) whether there are any remaining files to be installed and, if not, to close all bitmap images, any remaining dialog boxes, and the start-up screen and to terminate processing.

These process steps shown in FIGS. 7–9 are executed by CPU 20 by sequentially retrieving various files from floppy disk 44 via floppy disk drive interface 27 into main memory 30 and then storing those files into a specified directory in disk 42.

The process steps illustrated in FIGS. 7–9 illustrate the operation of CPU 20, which sequentially retrieves Setup 45 from floppy disk 44 via floppy disk drive interface 27, executes Setup 45 out of main memory 30, then in turn operates to retrieve additional files based on a user's selection of a component or application stored on floppy disk 45 and to store the files or to sequentially display a bitmap file on the end-user's system.

Now referring to FIG. 7, in step S700, upon the end-user loading floppy disk 44 in to floppy disk drive 13 and typing "setup" at the c: prompt, Setup 45 is retrieved from floppy disk 44 and executed by CPU 20. CPU 20 does not install Setup 45 in disk 42, but rather executes Setup 45 out of main memory 30. Upon being executed, in step S701, Setup 45 displays start-up screen 100 which includes title 101 of the current component or application to be installed.

Depending on whether the software programmer of Setup 45 included bitmap files to be automatically displayed by Setup 45 upon being executed, Setup 45, in step S702, sequentially retrieves bitmap files from floppy disk 44 and, based on the stored sequential order of the bitmap file, sequentially displays bitmap images in specified areas of screen 12 based on the destination codes appended to each bitmap file. For example, as shown in FIG. 10, bitmaps 103 and 104 are automatically retrieved and displayed in the upper left corner and lower right corner of start-up window 100, respectively. Bitmap images 103 and 104 remain displayed in its specified screen area, respectively, until such time as Setup 45 retrieves another bitmap file which is to be displayed in the currently occupied area of either bitmap 103 or 104. It is in this fashion that bitmap images will be sequentially displayed to the end-user based on the programmer's sequential bitmap scheduling during file distribution.

In the case the software programmer has not designed Setup 45 to automatically retrieve and to display bitmap files at the outset of the installation process, flow proceeds to step S704. In step S704, Setup 45 displays to the end-user dialog box 105. Dialog box 105 includes a listing of applications or components stored on floppy disk 44 from which the end-user can select one or more of the applications or programs to be installed at the end-user's system. For example, as shown in dialog box 105, floppy disk 44 includes: Guide Of Executable Files, Print Drivers For A Printer, Guide Text And Graphics, and Other Files. The end-user has the option of selecting at least one of the components or applications to be installed onto his system. Upon making the selection, Setup 45 begins to sequentially retrieve files from the distribution media, floppy disk 44. In this regard, Setup 45 examines each and every file stored on floppy disk 44 in order to determine if it belongs to the current component or application, whether it is to be installed or executed, or whether it is to be displayed.

Thus, in step S705, Setup 45 examines the first file from the distribution media, floppy disk 44. In step S707, Setup 45 determines whether to copy the file to the end-user's system. Setup 45 examines the assigned destination codes which define the file's attributes which is appended to the file by the Distribution Diskette Utility discussed previously.

In step S707, in the case that setup 45 determines that the file is not to be installed to the end-user's system, flow proceeds to step S800 in FIG. 8.

In step S800, Setup 45 determines if the file belongs to the current component or application. If the file does not belong to the current application or component, Setup 45 does not copy the file (step S801) and flow returns to step S705, at which point Setup 45 sequentially retrieves the next file stored on floppy disk 44. On the other hand, if the file belongs to the current component or application, Setup 45 determines if the file is to be displayed or if the file is to be executed. If Setup 45 determines that the file is to be executed in step S803, Setup 45 retrieves the file and CPU 20 executes the file in step S805. Once the file has been executed, flow returns to step S705 at which point Setup 45 sequentially retrieves the next file from distribution media.

If the file is not to be executed, but rather is to be displayed, Setup 45 displays the bitmap image in a specified display area which has been defined in the destination code appended to the file in step S806. For example, as shown in FIG. 10, bitmap 103 is displayed in the upper left-hand corner of start-up screen 100 based on an appended destination code of "a/c bitmap". Likewise, bitmap 104 is displayed in the lower right-hand corner of display screen 100. Each of the bitmaps will remain displayed until such time as another bitmap file is sequentially retrieved by Setup 45 which is to be displayed in the currently occupied area of either bitmap 103 or bitmap 104.

Once the bitmap image has been displayed, Setup 45 determines if more files are to be installed in step S807. If more files are to be installed for that current application or component, flow returns to step S705 and the next file is retrieved. On the other hand, if Setup 45 determines that no further files are to be retrieved from floppy disk 44, Setup 45 closes down any displayed bitmap images, any remaining dialog boxes, and start-up screen 100 in step S809. Upon closing down start-up screen 100, Setup 45 terminates processing and exits in step S810.

Reverting back to step S707 in FIG. 7, if it is determined that a file is to be copied to the end-user's system, flow proceeds to step S900 in FIG. 9.

In step S900, Setup 45 determines if the file belongs to the current component or application. If the file does not belong to the current application or component, Setup 45 does not copy the file (step S901) and flow returns to step S705, at which point Setup 45 sequentially retrieves the next file stored on floppy disk 44. On the other hand, if the file belongs to the current component or application, Setup 45 determines if the file already exists on the end-user's system (Step S902). If the file exists on the end-user's system, Setup 45 compares the version date stamp of the file on floppy disk 44 to the version date stamp on the end-user's system in step S903. In step S904, if the version date stamp of the file stored on floppy disk 44 is earlier than the version date stamp of the file stored on the end-user's system, the file is not copied to the end-user's system (step S905). However, if the version date stamp of the file stored on floppy disk 44 is later than the version date stamp of the file stored on the end-user's system, in step S906, the file is copied to the end-user's system.

On the other hand, if the file does not exist on the end-user's system in step S900, flow proceeds to S906 at which point the file is copied to the end-user's system. In either of the above cases, Setup 45 displays a dialog box 107 which includes a "fuel" gage which tracks the installation of the file to the end-user's system. Dialog box 67 also includes a "cancel" button which, if clicked on, aborts copying of the file. Dialog box 107 also includes a listing for both the source of the file and the destination of the file which is defined in the destination code.

Upon completing the installation of a file, Setup 45, in step S907, determines whether more files are to be installed. If more files are to be retrieved and installed, flow returns to step S705 at which point Setup 45 retrieves a next file in sequential order on the distribution media. On the other hand, if no further files are to be retrieved and installed, flow proceeds to step S908. In step S908, Setup 45 closes any displayed bitmap images, any remaining dialog boxes and start-up screen 100. Upon closing start-up screen 100 in step S910, Setup 45 terminates processing and exits.

The invention has been described with respect to a particular illustrated embodiment. It is to be understood that the present invention may be modified to operate on files which have been previously loaded by another distribution utility other than the Diskette Distribution Utility by Canon Information Systems. In addition, various changes and modifications may be made by those of ordinary skill in the art without departing from the spirit and scope of the invention.

What is claimed is:

1. A file installation method which retrieves setup files comprising computer files and bitmap images and displays the bitmap images on an end-user's system during installation of the computer files onto the end-user's system, the method comprising the steps of:

retrieving setup files from a computer-usable medium in the sequence that setup files are to be installed/displayed on the end-user's system, each retrieved setup file having a file destination code appended thereto; and after each setup file is retrieved:

determining, based on an appended file destination code, whether a retrieved setup file should be installed to the end-user's system, displayed on the end-user's system, or not installed on the end-user's system;

installing, based on a determination result that the retrieved setup file is to be installed, the retrieved setup file on the end-user's system; and displaying, based on a determination result that the retrieved setup file is to be displayed, the retrieved setup file on the end-user's system.

2. The method according to claim 1, further comprising the steps of displaying at least one file installation option prior to the retrieving step, and associating, with each retrieved setup file, a specific destination code corresponding to a selected file installation option.

3. The method according to claim 2, wherein, in the determining step, the specific destination code is compared to the file destination code of a file retrieved in the retrieving step in order to determine if the retrieved file should be installed or displayed onto the end-user's system.

4. The method according to claim 3, wherein in the retrieving step, the appended destination code includes a component or application association attribute, and either an install location code or a display location code.

5. The method according to claim 4, wherein in the determining step, an association attribute of the specific destination code is compared to an association attribute in the file destination code, and, in the case that the association attribute in the specific destination code does not match the association attribute of the file destination code, the retrieved setup file is not installed, and, in the case that the component or application association attribute does match, determining whether the retrieved setup file is to be installed or displayed based on an install location code or a display location in the file destination code.

6. The method according to claim 1, wherein the setup files are stored on the computer-usable medium in the sequence that the setup files are to be installed/displayed on the end-user's system; and wherein, in the retrieving step, the setup files are retrieved from the computer-usable medium in a sequence in which the setup files are stored on the computer-usable medium.

7. The method according to claim 1, wherein, in the displaying step, the retrieved setup file is a bitmap image.

8. The method according to claim 7, wherein, in the displaying step, bitmap images are sequentially displayed on the end-user's system based on a sequence in which corresponding files for the bitmap images are retrieved from the computer-usable medium.

9. The method according to claim 2, wherein the steps of retrieving, determining, and installing or displaying are repeated for every file stored on the computer-usable medium.

10. The method according to claim 1, wherein the computer-usable medium comprises a floppy disk.

11. The method according to claim 1, wherein the computer-usable medium comprises a CD-ROM.

12. The method according to claim 1, wherein, in the retrieving step, setup files are retrieved, via a modem, from a computer-usable medium comprised of a computer bulletin board.

13. The method according to claim 1, wherein the computer-usable medium comprises a network file server.

14. A file installation system which retrieves setup files comprising computer files and bitmap images and displays the bitmap images on an end-user's system during installation of the computer files onto the end-user's system, the system comprising:

input means for inputting a command;

an interface for accessing setup files on a computer-usable medium on which the setup files are stored; and process means for (1) retrieving setup files from the computer-usable medium via the interface in response to the command input by the input means, the process means retrieving the setup files from the computer-usable medium in the sequence that the setup files are to be installed/displayed on the end-user's system, each retrieved setup file having a file destination code appended thereto, and (2) after each setup file is retrieved:

(i) determining, based on an appended destination code, whether a retrieved setup file should be installed on the end-user's system, displayed on the end-user's system, or not installed on the end-user's system, (ii) installing, based on a determination result that the retrieved file is to be installed, the retrieved setup file on the end-user's system, and (iii) displaying, based on a determination result that the retrieved setup file is to be displayed, the retrieved setup file on the end-user's system.

15. The file installation system according to claim 14, wherein the process means displays at least one file installation option prior to retrieving the setup files from the computer-usable medium, associates with each retrieved setup file a specific destination code corresponding to a selected file installation option, and compares the specific destination code to the file destination code appended to the retrieved file in order to determine if the retrieved file should be installed or displayed onto the end-user's system.

16. The file installation system according to claim 15, wherein the appended file destination code includes a component or application association attribute and either an install location code or a display location code.

17. The file installation system according to claim 16, wherein the process means compares a component or application association attribute of the specific destination code to a component or application association attribute in the appended file destination code, and in the case that the component or application association attribute of the specific destination code does not match the component or application attribute in the appended file destination code, not installing the retrieved file, and, in the case that the component or application association attribute of the specific destination code does match the component or application association attribute in the appended file destination code, determining whether the retrieved file is to be installed or displayed based on an install location code or a display location code.

18. The file installation system according to claim 14, wherein the process means displays bitmap images sequentially on the end-user's system based on a sequence in which bitmap files corresponding to the bitmap images are retrieved from the computer-usable medium.

19. Computer-executable process steps stored on a computer-readable medium, the computer-executable process steps to retrieve setup files comprising computer files and bitmap images and to display the bitmap images on an end-user's system during installation of the computer files onto the end-user's system, the process steps comprising:

code to retrieve setup files from a computer-usable medium in the sequence that setup files are to be installed/displayed on an end-user's system, each retrieved setup file having a file destination code appended thereto; and code which, after each setup file is retrieved, is executable:

to determine, based on an appended file destination code, whether a retrieved setup file should be installed to the end-user's system, displayed on the end-user's system, or not installed on the end-user's system;

to install, based on a determination result that the retrieved setup file is to be installed, the retrieved setup file on the end-user's system; and to display, based on a determination result that the retrieved setup file is to be displayed, the retrieved setup file on the end-user's system.

20. Computer-executable process steps according to claim 19, further comprising code to display at least one file installation option prior to retrieving the setup files, and code to associate, with each retrieved setup file, a specific destination code corresponding to a selected file installation option.

21. Computer-executable process steps according to claim 19, wherein the code to determine includes code to compare the specific destination code to the file destination code of a file retrieved by the code to retrieve in order to determine if the retrieved file should be installed or displayed onto the end-user's system.

22. Computer-executable process steps according to claim 21, wherein the appended destination code includes a component or application association attribute and either an install location code or a display location code.

23. Computer-executable process steps according to claim 22, wherein the code to determine includes code to compare an association attribute of the specific destination code to an association attribute in the file destination code, and, in the case that the association attribute in the specific destination code does not match the association attribute of the file destination code, the retrieved setup file is not installed, and, in the case that the component or application association attribute does match, it is determined whether the retrieved setup file is to be installed or displayed based on an install location code or a display location in the file destination code.

24. Computer-executable process steps according to claim 19, wherein the setup files are stored on the computer-usable medium in the sequence that the setup files are to be installed/displayed on the end-user's system; and wherein the code to retrieve retrieves the setup files from the computer-usable medium in a sequence in which the setup files are stored on the computer-usable medium.

25. Computer-executable process steps according to claim 19, wherein the retrieved setup file is a bitmap image.

26. Computer-executable process steps according to claim 25, wherein the code to display displays bitmap images sequentially on the end-user's system based on a sequence in which corresponding files for the bitmap images are retrieved from the computer-usable medium.

27. Computer-executable process steps according to claim 20, wherein the code to retrieve, code to determine, and code to install or code to display are executed for every file stored on the computer-usable medium.

28. Computer-executable process steps according to claim 19, wherein the computer-usable medium comprises a floppy disk.

29. Computer-executable process steps according to claim 19, wherein the computer-usable medium comprises a CD-ROM.

30. Computer-executable process steps according to claim 19, wherein the code to retrieve retrieves setup files, via a modem, from a computer-usable medium comprised of a computer bulletin board.

31. Computer-executable process steps according to claim 19, wherein the computer-usable medium comprises a network file server.

32. A computer-readable medium which stores computer-executable process steps, the computer-executable process steps to retrieve setup files comprising computer files and bitmap images and display the bitmap images on an end-user's system during installation of the computer files onto the end-user's system, the process steps comprising:

a retrieving step to retrieve setup files from a computer-usable medium in the sequence that setup files are to be installed/displayed on an end-user's system, each retrieved setup file having a file destination code appended thereto; and after each setup file is retrieved:

a determining step to determine, based on an appended file destination code, whether a retrieved setup file should be installed to the end-user's system, displayed on the end-user's system, or not installed on the end-user's system;

an installing step to install, based on a determination result that the retrieved setup file is to be installed, the retrieved setup file on the end-user's system; and a displaying step to display, based on a determination result that the retrieved setup file is to be displayed, the retrieved setup file on the end-user's system.

33. A computer-readable medium according to claim 32, further comprising a displaying step to display at least one file installation option prior to the retrieving step, and an associating step to associate, with each retrieved setup file, a specific destination code corresponding to a selected file installation option.

34. A computer-readable medium according to claim 33, wherein, in the determining step, the specific destination code is compared to the file destination code of a file retrieved in the retrieving step in order to determine if the retrieved file should be installed or displayed onto the end-user's system.

35. A computer-readable medium according to claim 34, wherein in the retrieving step, the appended destination code includes a component or application association attribute, and either an install location code or a display location code.

36. A computer-readable medium according to claim 35, wherein in the determining step, an association attribute of the specific destination code is compared to an association attribute in the file destination code, and, in the case that the association attribute in the specific destination code does not match the association attribute of the file destination code, the retrieved setup file is not installed, and, in the case that the component or application association attribute does match, determining whether the retrieved setup file is to be installed or displayed based on an install location code or a display location in the file destination code.

37. A computer-readable medium according to claim 32, wherein the setup files are stored on the computer-usable medium in the sequence that the setup files are to be installed/displayed on the end-user's system; and wherein, in the retrieving step, the setup files are retrieved from the computer-usable medium in a sequence in which the setup files are stored on the computer-usable medium.

38. A computer-readable medium according to claim 32, wherein, in the displaying step, the retrieved setup file is a bitmap image.

39. A computer-readable medium according to claim 38, wherein, in the displaying step, bitmap images are sequentially displayed on the end-user's system based on a sequence in which corresponding files for the bitmap images are retrieved from the computer-usable medium.

40. A computer-readable medium according to claim 33, wherein the retrieving, determining, and installing or displaying steps are repeated for every file stored on the computer-usable medium.

41. A computer-readable medium according to claim 32, wherein the computer-usable medium comprises a floppy disk.

42. A computer-readable medium according to claim 32, wherein the computer-usable medium comprises a CD-ROM.

43. A computer-readable medium according to claim 32, wherein, in the retrieving step, the setup files are retrieved, via a modem, from a computer-usable medium comprised of a computer bulletin board.

44. A computer-readable medium according to claim 32, wherein the computer-usable medium comprises a network file server.

45. A method according to claim 1, wherein the determining step compares the retrieved setup file to a corresponding file already stored on the end-user's system in order to determine whether the corresponding file is a more recent version of the retrieved setup file; and wherein the determining step determines not to install the setup file on the end-user's system in a case that the corresponding file is a more recent version of the retrieved setup file.

46. The file installation system according to claim 14, wherein the process means compares the retrieved setup file to a corresponding file already stored on the end-user's system in order to determine whether the corresponding file is a more recent version of the retrieved setup file; and wherein the process means determines not to install the setup file on the end-user's system in a case that the corresponding file is a more recent version of the retrieved setup file.

47. Computer-executable process steps according to claim 19, wherein the code to determine includes code to compare the retrieved setup file to a corresponding file already stored on the end-user's system in order to determine whether the corresponding file is a more recent version of the retrieved setup file; and wherein the code to determine determines not to install the setup file on the end-user's system in a case that the corresponding file is a more recent version of the retrieved setup file.

48. A computer-readable medium according to claim 32, wherein the retrieving step includes a comparing step to compare the retrieved setup file to a corresponding file already stored on the end-user's system in order to determine whether the corresponding file is a more recent version of the retrieved setup file; and wherein the determining step determines not to install the setup file on the end-user's system in a case that the corresponding file is a more recent version of the retrieved setup file.

49. A method according to claim 1, wherein the setup file displayed in the displaying step comprises a bitmap image, and the bitmap image is displayed on an area of a monitor on the end-user's system; and wherein the method further comprises:

a second determining step for determining on which area of the monitor a subsequent bitmap image is to be displayed; and closing the bitmap image displayed in the displaying step in a case that a portion of the subsequent bitmap image overlaps the bitmap image displayed in the displaying step.

50. A method according to claim 1, wherein the bitmap image displayed in the displaying step remains displayed until either (1) all setup files have been retrieved from the computer usable medium, or (2) a subsequent bitmap image is to be displayed at a same location on the end-users's system as the bitmap image displayed in the displaying step.

51. A system according to claim 14, wherein the setup file displayed on the end-user's system comprises a bitmap image, and the bitmap image is displayed on an area of a monitor on the end-user's system; and wherein the process means determines on which area of the monitor a subsequent bitmap image is to be displayed, and closes the bitmap image already displayed on the monitor in a case that a portion of the subsequent bitmap image overlaps the bitmap image already displayed on the monitor.

52. A system according to claim 14, wherein the bitmap image displayed on the end-user's system remains displayed until either (1) all setup files have been retrieved from the computer usable medium, or (2) a subsequent bitmap image is to be displayed at a same location on the end-users's system as the bitmap image displayed on the end-user's system.

53. Computer-executable process steps according to claim 19, wherein the setup file displayed by the code to display comprises a bitmap image, and the bitmap image is displayed on an area of a monitor on the end-user's system; and wherein the computer-executable process steps further comprise:
code to determine on which area of the monitor a subsequent bitmap image is to be displayed; and
code to close the bitmap image displayed by the code to display in a case that a portion of the subsequent bitmap image overlaps the bitmap image displayed by the code to display.

54. Computer-executable process steps according to claim 19, wherein the bitmap image displayed by the code to display remains displayed until either (1) all setup files have been retrieved from the computer usable medium, or (2) a subsequent bitmap image is to be displayed at a same location on the end-users's system as the bitmap image displayed by the code to display.

55. A computer-readable medium according to claim 32, wherein the setup file displayed in the displaying step comprises a bitmap image, and the bitmap image is displayed on an area of a monitor on the end-user's system; and wherein the computer-executable process steps further comprise:
a second determining step to determine on which area of the monitor a subsequent bitmap image is to be displayed; and
a closing step to close the bitmap image displayed in the displaying step in a case that a portion of the subsequent bitmap image overlaps the bitmap image displayed in the displaying step.

56. A computer-readable medium according to claim 32, wherein the bitmap image displayed in the displaying step remains displayed until either (1) all setup files have been retrieved from the computer usable medium, or (2) a subsequent bitmap image is to be displayed at a same location on the end-users's system as the bitmap image displayed in the displaying step.

* * * * *